United States Patent [19]

Lofthouse et al.

[11] Patent Number: 5,407,140
[45] Date of Patent: Apr. 18, 1995

[54] DIFFERENTIAL GRINDING

[75] Inventors: Charles H. Lofthouse; Gary Moyle, both of Cornwall, United Kingdom

[73] Assignee: ECC International Limited, United Kingdom

[21] Appl. No.: 88,435

[22] Filed: Jul. 7, 1993

[30] Foreign Application Priority Data

Jul. 7, 1992 [EP] European Pat. Off. ............ 92306231

[51] Int. Cl.⁶ .......................... B03B 9/00; C09C 3/04
[52] U.S. Cl. ........................................ 241/21; 241/20
[58] Field of Search ................ 241/21, 4, 26, 30, 20, 241/16, 46.17, 184; 501/145

[56] References Cited

U.S. PATENT DOCUMENTS

| | | |
|---|---|---|
| 1,860,811 | 5/1932 | Little et al. . |
| 1,999,825 | 4/1935 | Saklatwalla et al. . |
| 3,171,718 | 3/1965 | Gunn et al. . |
| 3,476,576 | 11/1969 | Sennett et al. . |
| 3,536,264 | 10/1970 | Helton et al. . |
| 3,599,879 | 8/1971 | Clark . |
| 4,510,254 | 4/1985 | Morris et al. . |
| 4,561,597 | 12/1985 | Cook et al. . |
| 5,083,712 | 1/1992 | Ashew et al. .................. 241/21 X |

FOREIGN PATENT DOCUMENTS

| | | |
|---|---|---|
| 0267170 | 11/1988 | European Pat. Off. . |
| 3635010 | 4/1988 | Germany . |
| 1387100 | 3/1975 | United Kingdom . |
| 1475325 | 6/1977 | United Kingdom . |
| 1498539 | 1/1978 | United Kingdom . |

*Primary Examiner*—Douglas D. Watts
*Attorney, Agent, or Firm*—Klauber & Jackson

[57] ABSTRACT

There is described a process for the isolation of a fine mineral product from a low-grade source of the said mineral, the process comprising the following steps:
(i) forming a suspension in water of the said mineral source;
(ii) subjecting the suspension to grinding with a grinding medium having a specific gravity not greater than 2.0, the amount of energy dissipated in the suspension during the grinding operation being not greater than 50 kW.hrs per tonne of the dry mineral source; and
(iii) isolating from the ground suspension a fine fraction of particles comprising an increased amount of the said mineral when compared with the same fraction isolated from the unground mineral source.

30 Claims, No Drawings

DIFFERENTIAL GRINDING

DIFFERENTIAL GRINDING

This invention relates to a process for separating the components of a mixture of minerals, especially when the mixture consists of minerals exhibiting different degrees of hardness.

The process is especially suitable for concentrating kaolinite in low-grade crude kaolin or, more particularly, in a residue obtained from a process for extracting from raw kaolin a high-grade kaolin of the type which is used, for example, in paper coating compositions.

Hitherto, kaolinite-bearing residues of the type described above have been allowed to run to waste in tailings dams, but it would clearly be desirable to recover the kaolinite from the mineral mixture if a process for concentrating the kaolinire could be found which did not involve the expenditure of large quantities of energy. The residue may contain kaolinite in the form of stacks of lamellar particles, the stacks having a largest dimension of 10 µm or above. Often, the particles of the impurities which are associated with the kaolinire in the residue are of about the same size as the kaolinite stacks. In the case of English kaolins, the impurities present in the residue generally comprise quartz, mica, feldspar and small amounts of tourmaline and other minerals, all of which have a hardness value, as measured on the Moh scale, which is greater than that of kaolinite. In the case of kaolins from Georgia and North and South. Carolina, an additional impurity is an iron-containing titanium compound which is generally present in a more finely divided form than the kaolinire.

U.S. Pat. No. 3,171,718 describes a process for delaminating relatively large kaolin aggregates or stacks by grinding with a non-abrasive resilient plastics grinding media. The method of grinding involves high-speed stirring of the grinding media with the clay suspension and the consumption of energy in this process would be relatively high.

U.S. Pat. No. 3,476,576 describes a process in which a non-lamellar mineral, such as talc or calcium carbonate comprising particles generally smaller than No. 20 mesh A.S.T.M. Standard Sieve (nominal aperture 0.84 mm), is ground with a fine, non-abrasive, resilient grinding material. In the Examples, the mixture is either vigorously stirred with a propeller-type stirrer or cross-arm impeller or shaken on a "Red Devil" paint shaker in a polyethylene container. Both these methods use relatively large amounts of energy.

U.S. Pat. No. 3,536,264 concerns principally a process for removing titanium mineral impurities from kaolinitic clay. The kaolinitic clay may be the residue which is left after a coarse clay has been "fractured" to reduce its particle size and the fractured clay classified to produce a fine fraction, which is suitable for use in paper coating, and a relatively coarse residue. Various methods of fracturing are described, including "soft media grinding" which is said to be "very slow and inefficient when compared with hard media grinding".

According to a first aspect of this invention, there is provided a process for the isolation of a fine mineral product from a low-grade source of the said mineral, the process comprising the following steps:

(i) forming a suspension in water of the said mineral source;

(ii) subjecting the suspension to grinding with a grinding medium having a specific gravity not greater than 2.0, the amount of energy dissipated in the suspension during the grinding operation being not greater than 50 kW.hrs per tonne of the dry mineral source; and (iii) isolating from the ground suspension a fine fraction of particles comprising an increased amount of the said mineral when compared with the same fraction isolated from the unground mineral source.

The low grade source of the mineral will generally be a low-grade kaolinitic clay or a residue from a refining plant which produces a fine grade paper coating clay from raw kaolin, but the process may also be used for treating other low grade sources of minerals such as, for example, friable and soft copper oxides within a hard limestone matrix and friable and soft wolframite within a hard granite matrix. The source is "low grade" primarily because it is impure, i.e. it has a relatively low content of the desired mineral, more particularly kaolinite, and secondarily because it is relatively course when compared with high value mineral products, such as, for example, paper coating grade kaolins.

The process is of particular benefit when the desired mineral has a lower hardness (on the Mohs scale) than the other mineral components of the source. It is especially useful when the mineral source consists predominantly of particles having an equivalent spherical diameter larger than 10 µm and all the components of the mineral source (including the mineral impurities) are present in approximately the same particle sizes and have approximately the same specific gravity, but the desired mineral has a lower hardness on the Mohs scale than the other mineral components. The present invention takes advantage of this difference in hardness between the mineral components to effect what would otherwise be a difficult separation.

In step (i), the suspension should generally have a viscosity no greater than about 20 poise (2 Pa.s) as measured with a Brookfield viscometer at a spindle speed of 100 rpm. The solids content at which this viscosity is reached depends on the nature of the mineral and whether or not a dispersing agent is present. Without a dispersing agent, the maximum solids content attainable for most mineral sources which are susceptible to treatment by the present invention is about 40% by weight, and with a dispersing agent solids content of up to about 55% by weight may be achieved. The dispersing agent which may be added in step (i) in order to prevent the suspension from becoming undesirably viscous may be, for example, a water soluble salt of a polysilicic acid, a water soluble condensed phosphate salt, a water soluble salt of poly(acrylic acid) or of poly(methacrylic acid) or a copolymer dispersing agent of the type disclosed in GB-A-1414964.

In step (ii) the grinding medium preferably has a specific gravity not greater than 1.5, and may conveniently comprise granules of a plastics material such as nylon, polyethylene, poly(vinyl chloride), poly(tetrafluoroethylene), polystyrene or a copolymer of styrene with one or more other monomers. The best results, in terms of the fine product having a low abrasion value, are obtained when the grinding medium is substantially free from any grinding agent having a specific gravity greater than 2.0, preferably greater than 1.5.

The largest dimension of the granules of the grinding medium is preferably not greater than 5 mm and the granules will most advantageously have a largest dimension in the range 0.5 to 3 mm. The granules may be approximately spherical, cylindrical or cubic in shape.

Preferably the amount of energy dissipated in the suspension during the grinding step does not exceed 25 kW.hrs per tonne of the dry mineral source.

The weight ratio of grinding medium to the dry mineral source is preferably in the range of from 2:1 to 5:1. The volumetric ratio of grinding medium to the suspension of the mineral source is preferably in the range of from 0.5:1 to 3:1.

The grinding step may be performed in any grinding apparatus capable of dissipating only a small amount of energy (not greater than 50 kW.hrs per tonne of the dry mineral source) in the suspension during grinding. It has been found that the relatively small amount of energy is sufficient to grind the softer components of the mineral source, such as kaolinite, in preference to the harder components such as quartz, feldspar and tourmaline. A tumbling mill (i.e. a drum rotating about a substantially horizontal axis and containing the grinding medium) is particularly suitable as the grinding apparatus, although any other grinding apparatus, such as a simple stirred pot, may be used as long as it is capable of being operated to dissipate the small amount of energy required during grinding.

In step (iii), the suspension of the ground mineral source is subjected to a particle size separation such that substantially all particles having an equivalent spherical diameter larger than the desired maximum size of the fine fraction are removed. The fine fraction isolated may, for instance, comprise particles substantially all of which have an equivalent spherical diameter up to a value in the range of from 10 to 20 $\mu$m, preferably up to a value in the range of from 10 to 18 $\mu$m and most preferably up to a value in the range of from 12 to 15 $\mu$m. The particle size separation may be performed by gravitational or centrifugal sedimentation, and, if the suspension is not already in a deflocculated state, a dispersing agent of the type described above may be added before the particle size separation step.

The invention will now be illustrated by reference to the following Examples.

EXAMPLE 1

The feed mixture for the experiment was a final residue from a Cornish kaolin processing plant consisting predominantly of particles having an equivalent spherical diameter larger than 10 $\mu$m.

The final residue was subjected to mineralogical analysis by X-ray diffraction and the results are shown in Table 1 which appears at the end of this description. The final residue was also subjected to a particle size separation to give a fine product having substantially all particles smaller than 12 $\mu$m and the mineralogical analysis and particle size data of the fine fraction are also given in Table 1.

The residue was deflocculated with sodium silicate solution to give a suspension having a pH of 6.5 and a specific gravity of 1.390 (approximately 45% by weight of solids). The suspension was divided into three portions each of which was subjected to grinding for 120 minutes with a grinding medium in a ceramic drum of total capacity 2.5 litres, which was rotated at a constant speed of 71 rpm (61% of the critical speed) by means of electrically-driven rollers. A different grinding medium was used for each portion but in each case there were used 2.4 parts by weight of grinding medium to 1 part by weight of dry residue solids.

Portion A was ground with 12.7 mm diameter ceramic balls of specific gravity 2.7 and the energy dissipated in the suspension was 61 kW.hrs per tonne of dry residue solids.

Portion B was ground with 9.5–12.7 mm diameter flint pebbles of specific gravity 2.6 and the energy dissipated in the suspension was 59 kW.hrs per tonne of dry residue solids.

Portion C was ground with nylon pellets of diameter 2–3 mm and specific gravity 1.1 and the energy dissipated in the suspension was less than 25 kW.hrs per tonne of dry residue solids.

In each case, after grinding, the suspension was subjected to a particle size separation to give a fine fraction having substantially all particles finer than 12 $\mu$m. The fine products were then examined for particle size distribution and mineralogical analysis. The results are set forth in Table 1. (The figure in brackets in this and each succeeding Table are percentages by weight of the total amount of each mineral present in the original residue which appears in the fine fraction).

These results show that when the kaolin residue is ground with a relatively low density grinding medium and with an energy dissipation of less than 25 kW.hrs per tonne of dry mineral mixture, as is the case with Portion C, and the ground product is subjected to a particle size classification to remove particles having an equivalent spherical diameter larger than 12 $\mu$m, there is obtained a product which has an acceptable mineralogical composition and in which a larger proportion of the original kaolinite and smaller proportions of the original quartz and feldspar are recovered than is the case when the residue is ground with a grinding medium of higher density and with the dissipation of a larger amount of energy. The process of the invention therefore provides a convenient method for concentrating kaolinite in a mineral mixture.

EXAMPLE 2

A further batch of the same suspension of residue as was used in Example 1 was divided into five portions each of which was subjected to grinding in the same apparatus and using the same nylon pellets and under the same conditions as were described in connection with Portion C in Example 1 except that the weight ratio of nylon pellets to dry residue solids for each portion was as given below:

|  | wt. of nylon pellets: wt. of dry residue solids |
| --- | --- |
| Portion D | 0.6:1 |
| Portion E | 1.2:1 |
| Portion F | 1.7:1 |
| Portion G | 2.3:1 |
| Portion H | 3.6:1 |

In each case, the amount of energy dissipated in the suspension did not exceed 25 kW.hrs per tonne of dry residue solids. After grinding, the suspension was subjected to a particle size separation to give a fine fraction having substantially all particles finer than 12 $\mu$m. The fine products were then examined for particle size distribution and mineralogical analysis and the results are set forth in Table 2 which appears at the end of this description.

It will be seen that, as the weight ratio of nylon pellets to dry residue solids increases, so the quality of the fine fraction decreases slightly but the quantity of kaolinite recovered in the fine fraction increases. In order to achieve a good combination of acceptable mineralogical composition and good recovery of kaolinite it is necessary to use a weight ratio of nylon pellets to dry residue solids in excess of 2:1.

EXAMPLE 3

A final residue suspension from a different Cornish kaolin refining plant was fed continuously through a rotating, rubber-lined drum, containing as the grinding medium nylon pellets of size 2–3 mm and specific gravity 1.1. The residue suspension was flocculated and at a pH of 3–4 and had a specific gravity of 1.200 (approximately 27% by weight of dry residue solids). The total capacity of the drum was 83 litres and the speed of rotation 42rpm (75% of critical speed). The suspension was passed through the rotating drum at a flow rate of 720cm$^3$.min$^{-1}$ which corresponded to an average residence time in the drum of 34 minutes. The average amount of energy dissipated in the suspension was less than 25 kW.hrs per tonne of dry residue solids. Four runs were carried out with weight ratios of grinding pellets to dry residue solids of 3.42:1, 3.65:1, 4.14:1 and 4.51:1 respectively. The volume ratios of grinding pellets to suspension were respectively 2.00:1, 2.15:1, 2.42:1 and 2.64:1.

In each case the ground product was deflocculated with sodium silicate and subjected to a particle size separation to give a fine fraction having substantially all particles finer than 12 μm. The original residue was also subjected to a similar particle size separation. In each case the fine fraction was examined for particle size distribution and mineralogical analysis and the results are set forth in Table 3 which appears at the end of this description.

EXAMPLE 4

Further samples of the same final residue suspension as was used in Example 3 were fed continuously through the same rotating drum as was used in Example 3 but in each case there was used as the grinding medium a different mixture of nylon pellets of size 2–3 mm and specific gravity 1.1 and flint pebbles of size 2–3 mm and specific gravity 2.65. The flint pebbles were prepared by screening a batch of small beach pebbles and retaining the fraction having the required size range. The residue suspension in each case had a specific gravity in the range of from 1.270 to 1.300 (34% to 37% by weight of solids). In each case the volume ratio of grinding medium to suspension was 1.46:1. The speed of rotation of the drum was 42 rpm (75% of critical speed) and the suspension was passed through the rotating drum at a flow rate of 340cm$^3$.min$^{-1}$ which corresponded to an average residence time in the drum of 72 minutes.

In each case the ground product was deflocculated and subjected to a particle size separation to give a fine fraction having substantially all particles finer than 12 μm. The original residue was also subjected to a similar particle size separation. In each case the fine fraction was examined for particle size distribution, mineralogical analysis and abrasion and the results are set forth in Table 4 which appears at the end of this description.

The abrasion value of a sample is measured by preparing an aqueous suspension of the sample having a specific gravity of 1.030±0.0003 and a pH of 4.5–5.5. A fixed volume of 200cm$^3$ of this suspension is propelled by compressed air at a pressure of 75 psig (516 kPa) at high velocity through a semicircular channel, the larger radius of which is formed by a strip of radioactive material. The abrasion value of the sample is related to the wear on this strip by measuring the radioactivity of the suspension after one passage through the semicircular channel, It will be seen that the fine fraction having the lowest abrasion is obtained when the residue is ground with 100% of nylon pellets. The introduction of even a small proportion of the denser grinding medium gives a fine fraction of higher abrasion while making very little difference to the proportion by weight of the kaolinire present in the residue which is recovered in the fine fraction.

TABLE 1

|  | Original residue | Fine fraction of original residue | Portion A fine fraction | Portion B fine fraction | Portion C fine fraction |
| --- | --- | --- | --- | --- | --- |
| % of residue weight | 100 | 8 | 21 | 19 | 31 |
| % larger than 10 μm | 76 | 10 | 13 | 8 | 10 |
| % smaller than 2 μm | 6 | 45 | 37 | 41 | 39 |
| Kaolin | 39 | 87(19) | 61(33) | 64(31) | 76(60) |
| Mica | 39 | 10(2) | 19(10) | 18(9) | 18(14) |
| Quartz | 7 | 1(1) | 4(13) | 3(9) | 1(4) |
| Feldspar | 15 | 2(1) | 16(23) | 15(19) | 5(10) |

TABLE 2

|  | Portion D fine fraction | Portion E fine fraction | Portion F fine fraction | Portion G fine fraction | Portion H fine fraction |
| --- | --- | --- | --- | --- | --- |
| % of residue wt. | 11 | 12 | 14 | 25 | 34 |
| % larger than 10 μm | 8 | 10 | 12 | 14 | 10 |
| % smaller than 2 μm | 48 | 46 | 44 | 36 | 31 |
| Kaolin | 82(23) | 79(24) | 78(28) | 76(49) | 72(63) |
| Mica | 14(4) | 16(5) | 17(6) | 18(2) | 21(18) |
| Quartz | 1(2) | 1(2) | 1(2) | 1(4) | 2(10) |
| Feldspar | 3(2) | 4(3) | 4(4) | 5(8) | 5(11) |

TABLE 3

|  | Original residue | Fine fraction of original residue | Fine fraction of ground product obtained with wt. ratio nylon pellets:dry residue solids | | | |
| --- | --- | --- | --- | --- | --- | --- |
|  |  |  | 3.42:1 | 3.65:1 | 4.14:1 | 4.51:1 |
| % of residue weight | 100 | 10 | 23 | 27 | 35 | 35 |
| % larger than 10 μm | 82 | 18 | 15 | 17 | 14 | 14 |
| % smaller than 2 μm | 4 | 26 | 28 | 28 | 32 | 26 |
| Kaolin | 55 | 83(15) | 85(36) | 81(40) | 83(53) | 81(52) |
| Mica | 30 | 13(4) | 15(12) | 18(16) | 16(19) | 18(21) |
| Quartz | 5 | 1(2) | 0 | 1(5) | 1(7) | 1(7) |
| Feldspar | 7 | 3(4) | 0 | 0 | 1(5) | 0 |
| Tour- | 3 | 0 | 0 | 0 | 0 | 0 |

TABLE 3-continued

| | Original residue | Fine fraction of original residue | Fine fraction of ground product obtained with wt. ratio nylon pellets:dry residue solids | | | |
|---|---|---|---|---|---|---|
| | | | 3.42:1 | 3.65:1 | 4.14:1 | 4.51:1 |
| maline | | | | | | |

TABLE 4

| | Original residue | Fine fraction of original residue | Wt. ratio pebbles:nylon pellets | | | | | |
|---|---|---|---|---|---|---|---|---|
| | | | 100:0 | 50:50 | 20:80 | 10:90 | 5:95 | 0:100 |
| Wt. ratio grinding medium:dry residue solids | | | 8.04:1 | 5.36:1 | 3.90:1 | 3.45:1 | 3.10:1 | 2.84:1 |
| Amount of energy dissipated (kW.hrs/tonne) | | | 35 | 26 | 22 | 17 | 16 | 15 |
| % of residue weight | 100 | 11 | 55 | 46 | 44 | 42 | 42 | 42 |
| % larger than 10 μm | 80 | 18 | 12 | 9 | 11 | 10 | 11 | 11 |
| % smaller than 2 μm | 6 | 32 | 34 | 38 | 39 | 38 | 35 | 36 |
| Kaolin | 61 | 86(16) | 71(64) | 85(64) | 84(61) | 80(55) | 84(58) | 85(59) |
| Mica | 27 | 13(5) | 15(31) | 12(20) | 15(24) | 18(28) | 15(23) | 15(23) |
| Quartz | 6 | 0 | 4(37) | 0 | 0 | 1(7) | 1(7) | 0 |
| Feldspar | 6 | 1(2) | 10(92) | 3(23) | 1(7) | 1(7) | 0 | 0 |
| Abrasion | >1000 | 201 | 260 | 120 | 92 | 73 | 66 | 63 |

We claim:

1. A process for the isolation of a fine mineral product from a low-grade source of the said mineral, the process comprising the following steps:
   (i) forming a suspension in water of the said mineral source;
   (ii) subjecting the suspension to grinding with a grinding medium having a specific gravity not greater than 2, the amount of energy dissipated in the suspension during the grinding operation being not greater than 50 kW.hrs per tonne of the dry mineral source; and
   (iii) isolating from the ground suspension a fine fraction of particles comprising an increased amount of the said mineral when compared with the same fraction isolated from the unground mineral source,
wherein the largest dimension of the granules of the grinding medium is not greater than 5 mm.

2. A process according to claim 1, wherein the solids content of the suspension formed in step(i) is no greater than about 55% by weight.

3. A process according to claim 1, wherein the grinding medium in step (ii) has a specific gravity not greater than about 1.5.

4. A process according to claim 1, wherein the grinding medium comprises granules of a plastics material.

5. A process according to claim 1, wherein the grinding medium is substantially free from any grinding agent having a specific gravity greater than 2.0.

6. A process according to claim 1, wherein the amount of energy dissipated in the suspension during the grinding step does not exceed 25 kW.hrs per tonne of the dry mineral source.

7. A process for the isolation of a fine mineral product from a low-grade source of the said mineral, the process comprising the following steps:
   (i) forming a suspension in water of the said mineral source;
   (ii) subjecting the suspension to grinding with a grinding medium having a specific gravity not greater than 2, the amount of energy dissipated in the suspension during the grinding operation being not greater than 50 kW.hrs per tonne of the dry mineral source; and
   (iii) isolating from the ground suspension a fine fraction of particles comprising an increased amount of the said mineral when compared with the same fraction isolated from the unground mineral source,
wherein the weight ratio of grinding medium to the dry mineral source is in the range of 2:1 to 5:1.

8. A process according to claim 1, wherein the grinding step is performed in a tumbling mill.

9. A process according to claim 1, wherein, in step (iii), the suspension of the ground mineral source is subjected to a particle size separation such that substantially all particles having an equivalent spherical diameter larger than the desired maximum size of the fine fraction are removed.

10. A process for the isolation of a fine mineral product from a low-grade source of the said mineral, the process comprising the following steps:
   (i) forming a suspension in water of the said mineral source;
   (ii) subjecting the suspension to grinding with a grinding medium having a specific gravity not greater than 2.0, the largest dimension of the granules of the grinding medium being not greater than 5 mm and the weight ratio of grinding medium to the dry mineral source being in the range of from 2:1 to 5:1, the amount of energy dissipated in the suspension during the grinding operation being not greater than 50 kW.hrs per tonne of the dry mineral source; and
   (iii) subjecting the suspension of the ground mineral source to a particle size separation such that substantially all particles having an equivalent spherical diameter larger than the desired maximum size of the fine fraction are removed thereby isolating from the ground suspension a fine fraction of particles comprising an increased amount of the said mineral when compared with the same fraction when isolated from the unground mineral source.

11. A process for the isolation of a fine mineral product from a low-grade source of the said mineral, in which process, substantially all of the mineral source consists of particles having an equivalent spherical diameter larger than 10 μm, all of the components of the mineral source including the mineral impurities being present in approximately the same particle sizes and having approximately the same specific gravity, the desired mineral having a lower hardness on the Mohs scale than the other mineral components, the process comprising the following steps:

(i) forming a suspension in water of the said mineral source;

(ii) subjecting the suspension to grinding with a grinding medium having a specific gravity not greater than 2.0, the amount of energy dissipated in the suspension during the grinding operation being not greater than 50 kW.hrs per tonne of the dry mineral source; and (iii) isolating from the ground suspension a fine fraction of particles comprising an increased amount of the said mineral when compared with the same fraction isolated from the unground mineral source.

12. A process according to claim 7, wherein the solids content of the suspension formed in step (i) is no greater than about 55% by weight.

13. A process according to claim 7, wherein the grinding medium in step (ii) has a specific gravity not greater than about 1.5.

14. A process according to claim 7, wherein the grinding medium comprises granules of a plastics material.

15. A process according to claim 7, wherein the grinding medium is substantially free from any grinding agent having a specific gravity greater than 2.0.

16. A process according to claim 7, wherein the amount of energy dissipated in the suspension during the grinding step does not exceed 25 kW.hrs per tonne of the dry mineral source.

17. A process according to claim 7, wherein the grinding step is performed in a tumbling mill.

18. A process according to claim 7, wherein, in step (iii), the suspension of the ground mineral source is subjected to a particle size separation such that substantially all particles having an equivalent spherical diameter larger than the desired maximum size of the fine fraction are removed.

19. A process according to claim 10, wherein the grinding medium in step (ii) has a specific gravity not greater than about 1.5.

20. A process according to claim 10, wherein the grinding medium comprises granules of a plastics material.

21. A process according to claim 10, wherein the grinding medium is substantially free from any grinding agent having a specific gravity greater than 2.

22. A process according to claim 10, wherein the amount of energy dissipated in the suspension during the grinding step does not exceed 25 kW.hrs per tonne of the dry mineral source.

23. A process according to claim 10, wherein the grinding step is performed in a tumbling mill.

24. A process according to claim 10, wherein, in step (iii), the suspension of the ground mineral source is subjected to a particle size separation such that substantially all particles having an equivalent spherical diameter larger than the desired maximum size of the fine fraction are removed.

25. A process according to claim 11, wherein the grinding medium in step (ii) has a specific gravity not greater than about 1.5.

26. A process according to claim 11, wherein the grinding medium comprises granules of a plastics material.

27. A process according to claim 11, wherein the grinding medium is substantially free from any grinding agent having a specific gravity greater than 2.

28. A process according to claim 11, wherein the amount of energy dissipated in the suspension during the grinding step does not exceed 25 kW.hrs per tonne of the dry mineral source.

29. A process according to claim 11, wherein the grinding step is performed in a tumbling mill.

30. A process according to claim 11, wherein, in step (iii), the suspension of the ground mineral source is subjected to a particle size separation such that substantially all particles having an equivalent spherical diameter larger than the desired maximum size of the fine fraction are removed.

* * * * *